United States Patent [19]
Chan et al.

[11] Patent Number: 5,574,726
[45] Date of Patent: Nov. 12, 1996

[54] INTER-REPEATER BACKPLANE

[75] Inventors: David T. Chan, Fair Oaks; Haim Shafir, Sacramento; Stefan M. Wurster, Livermore, all of Calif.

[73] Assignee: Level One Communications, Inc., Sacramento, Calif.

[21] Appl. No.: 380,651

[22] Filed: Jan. 30, 1995

[51] Int. Cl.$^6$ .............................. H04L 12/46; H04L 12/66
[52] U.S. Cl. ........................ 370/85.3; 370/85.13; 370/91; 370/97; 375/221
[58] Field of Search .............................. 370/13, 13.1, 14, 370/85.1, 85.2, 85.3, 85.9, 85.11, 85.13, 97, 94.3, 110.1; 375/211, 212, 213; 379/338; 178/70 R, 71 R, 71 B

[56] References Cited

U.S. PATENT DOCUMENTS

| | | | |
|---|---|---|---|
| 4,063,220 | 12/1977 | Metcalfe et al. | 340/147 |
| 4,099,024 | 7/1978 | Boggs et al. | 178/74 R |
| 5,249,183 | 9/1993 | Wong et al. | 370/85.3 |
| 5,345,447 | 9/1994 | Noel | 370/85.3 X |
| 5,406,559 | 4/1995 | Edem et al. | 370/91 |

OTHER PUBLICATIONS

AT&T Microelectronics, *T7202 Smart Hub Controller (SHC)*, Preliminary Data Sheet, Sep. 1992, entire document.
AT&T *T7201 Multi-Port Repeater Unit (MPR2)*, Preliminary Data Sheet, Jun. 1990, entire document.
Micro Linear, *10BASE-T Transceiver for Multi-Port Repeaters*, Advance Information, Sep. 1989, pp. 1–10.
Advanced Micro Devices, Am79C981 Integrated Multiport Repeater Plus™ (IMR+™), Preliminary, Feb. 1993, entire document.
National Semiconductor, *DP83950A Repeater Interface Controller (RIC)*, Preliminary, Sep. 1991, entire document.
National Semiconductor, *DP83950A/DP83956 LitE End Repeater Interface Controller (LERIC™)*, Preliminary, May 1992, entire document.
AT&T, *T7240 Twisted–Pair Port Transceiver (TPORT) Issue 2*, Advance Data Sheet (DRAFT), 1989, entire document.

*Primary Examiner*—Alpus H. Hsu
*Assistant Examiner*—Ricky Q. Ngo
*Attorney, Agent, or Firm*—Merchant, Gould, Smith, Edell, Welter & Schmidt

[57] ABSTRACT

An inter-repeater backplane that allows either synchronous or asynchronous data transmission between multiple repeaters integrated into a single hub and enables any repeater to be swapped out without causing the backplane to crash, hang-up, or pass error messages. A dual analog, digital collision signaling scheme is utilized to obviate the need for additional drivers or external glue logic for arbitration. "the specific port of a hub receiving data (PORTN)". and The one port left state (PORTM) information is embedded within the backplane signals. Thus, the backplane scheme according to the present invention is completely seamless. Unique state machines enable the repeater to transmit data either synchronously or asynchronously. In the synchronous mode of data transmission, the data is synchronized with the system clock. When the asynchronous mode of data transmission is selected, the recovered data is synchronized with a clock signal associated with the transmitting repeater. Mixed signal state machines operate in conjunction with the dual analog, digital collision signaling scheme to prevent malfunctions when individual repeaters are swapped or removed. The mixed signal state machines implement the functions of the repeaters and control the transitions on the backplane. Thus, the unique analog digital backplane combination in conjunction with the repeater inter-repeater blackplane (IRB) state machine makes bus arbitration unnecessary.

25 Claims, 7 Drawing Sheets

REPEATER STATE DIAGRAM

BACKPLANE STATE DIAGRAM

INTER-REPEATER BACKPLANE

CROSS-REFERENCE TO RELATED APPLICATIONS

This application is related to:

Application Ser. No. 08/379,903, entitled "Inter-Repeater Backplane With Mixed Signal State Machine Interconnect," filed on Jan. 30, 1995 by R. Andersson et al., and assigned to the assignee of this application;

Application Ser. No. 08/379,907, entitled "Inter-Repeater Backplane With Synchronous/Asynchronous Dual Mode Operation," filed on Jan. 30, 1995 by R. Andersson et al., and assigned to the assignee of this application; and Application Ser. No. 08/380,074, entitled "Inter-Repeater Backplane For Allowing Hot-Swapping Of Individual Repeater Circuits," filed on Jan. 30, 1995 by D. Chan et al., and assigned to the assignee of this application.

All of the above-identified applications are incorporated by reference herein.

BACKGROUND OF THE INVENTION

1. Field of the Invention.

This invention relates in general to an inter-repeater backplane and method, and more particularly, to an inter-repeater backplane that uses a modified IEEE 802.3 repeater state machine in conjunction with a backplane state machine to operate in either the synchronous or asynchronous mode and which does not require external bus arbitration circuits to control access to the backplane thereby facilitating the removal and replacement of repeater circuits during operation.

2. Description of Related Art.

The communications industry has experienced phenomenal growth over the past several years. Much of this growth has occurred in the area of telecommunications involving computers and computer generated or stored data. The exchange of messages and data has been facilitated by the advent of local and metropolitan area networks. Remotely located computer users communicate over the local and metropolitan area networks to access data and to communicate with other remote computer users.

In such networks, nodes are connected to a bus and have multiple, or concurrent access to the communications medium. Control techniques are used to allow access to the communication medium and to resolve contention between the various users. Typically, a carrier sense, multiple access with collision detection (CSMA/CD) scheme is used. With CSMA/CD a node listens for activity and begins sending message packets when the node determines that no activity is occurring over the network. Sometimes simultaneous transmission by multiple nodes occurs. This results in collisions between the different message packets. When a node detects a collision, a signal is sent over the network to the other transmitting nodes. The affected nodes terminate their transmissions and probabilistically reschedule their next attempt to transmit.

The standard for Local and Metropolitan Area Network technologies is governed by IEEE Std. 802–1991. IEEE Std. 802–1991 describes the relationship among the family of 802 standards and their relationship to the ISO Open System Interconnection Basic Reference Model and is herein incorporated by reference. IEEE Std. 802.3–1991 defines the standards for a bus utilizing collision sense multiple access/ collision detection (CSMA/CD) as a data link access method and is herein also incorporated by reference.

Typically, unshielded twisted pair cables or existing telephone wiring is used as the transmission medium to provide an economical solution to networking. However, the attenuation of signals transmitted over unshielded twisted pair cables increases as the distance between data terminal equipment becomes greater. Thus, repeaters are inserted in the twisted pair cables to facilitate greater distances.

To increase the number of data channels, repeater manufacturers have designed repeater hardware which can be cascaded together into a single hub. However, state machine information must be passed between the repeaters over a inter-repeater backplane in order to allow the repeaters to behave as a single hub.

The transmission of data with a repeater system may be accomplished either synchronously or asynchronously. Repeaters have previously operated in either the synchronous or asynchronous mode but not both. For example, Advanced Micro Devices' Am79C981 sends data over the backplane synchronous to the master clock of the Am79C981. Similarly, the AT&T T7201 Multi-port Repeater in combination with the At&T T7202 Smart Hub Controller sends data over the backplane synchronous to the master clock of the chip.

In contrast, National Semiconductor's DP83950A Repeater Interface Controller and the DP83955/DP83956 Lite End Repeater Interface Controller devices (RIC and LERIC respectively) operate in the asynchronous mode when communicating over the backplane. In asynchronous mode the recovered clock is used to clock data to adjacent chips. The asynchronous character of the data transmission derives from the fact that the recovered clock is asynchronous to the system or local clock and therefore requires some form of timing instructions distinct from the system clock.

In addition to the limitations concerning the mode of data transmission, prior art repeaters have required arbitration to control the inter-repeater bus. Repeaters integrated into a single modular hub could not be removed and/or plugged in without the additional circuitry to take care of bus arbitration or the removal of a signal contained therein. Accordingly, boards or repeater chips which were hot-swapped in or out caused the hub system to pass errors, crash, or hang up.

For example, AT&T's MPR2 and SHC chips integrate repeater functions specified by Section 9 of the IEEE 802.3 Standard and twisted-pair transceiver functions complying with the 10Base-T standard. AT&T's MPR2 and SHC have an output pin (ACTIVE) which goes high when any input to the chip is detected. An expansion controller for the chip must be built from discrete logic to monitor the ACTIVE pin from each of the chip comprising the hub. The expansion controller is also needed to pass PORTM, PORTN, and collision information between the repeater chips on the hub. The arbitration scheme controls which chip is controlling the bus at any given time and how collision events are handled.

Advanced Micro Device's IMR+ repeater chip also requires arbitration to control the inter-repeater bus. Advanced Micro Device's IMR+ has an output pin REQ(bar) which goes low when any input to the chip is detected. An expansion controller for the chip must be built from discrete logic to monitor the REQ(bar) pin from each of the chips comprising the hub. The expansion controller is also needed to pass PORTN between the repeater chips. The arbitration scheme controls which chip is controlling the bus at any given time.

National Semiconductor's RIC and LERIC chips require arbitration to control the inter-repeater bus. National Semiconductor's RIC and LERIC chips are more seamless than the repeaters designed by AT&T and Advanced Micro Devices. Nevertheless, to prevent crashes, hang-ups, and to pass error messages, National Semiconductor's RIC chip requires a priority assignment for each of its 13 ports. The top and bottom of this chain is available to the user so that for a multiple chip hub, there will be a daisy chained priority assignment where the AUI port on the first chip has the highest priority and twisted pair port number 12 on the last chip has the lowest priority.

For small configurations, the RICs arbitration scheme is easy to implement. The chip's ACKI(bar) and ACKO(bar) pins can be daisy chained directly, input to output. However, for larger systems the National Semiconductor RIC chip runs into problems with its port arbitration scheme. If a system backplane is used with each RIC placed on a plug-in PC board, the user is forced to use external logic to perform arbitration. The alternative is the already discussed daisy chain arbitration which will disable all the ports lower in the chain if a higher priority board is removed. Further, PORTM and PORTN need this arbitration scheme to be passed between the repeater chips and interpreted correctly.

There is a need, therefore, for a backplane which facilitates both synchronous and asynchronous modes and which allows seamless integration of multiple repeaters into a single hub wherein each repeater may be swapped out without causing the backplane to crash, hang-up or pass error messages. There is also a need for an inter-repeater backplane which does not require additional drivers or external glue logic to implement a multiple board system design.

SUMMARY OF THE INVENTION

To overcome the limitations in the prior art described above, and to overcome other limitations that will become apparent upon reading and understanding the present specification, the present invention discloses an inter-repeater backplane and method that allows seamless integration of multiple repeaters into a single hub wherein each repeater may be swapped out without causing the backplane to crash, hang-up or pass error messages. Further the inter-repeater backplane employs either a synchronous or an asynchronous mode to convey data to adjacent repeaters across a backplane.

The present invention solves the above-described problems by providing an inter-repeater backplane which allows repeaters to be connected together into a single hub with each repeater capable of transmitting data either synchronously or asynchronously, and allows hot-swapping of individual repeaters or boards without requiring additional drivers or external glue logic to implement a multiple board system design.

A method in accordance with the principles of the present invention includes initializing the backplane, determining whether ports on repeaters interconnected by the backplane are active, determining the mode of data transmission, sending preambles over the backplane, waiting for a first predetermined period of time in response to the asynchronous mode being selected and a port in the repeater receiving data going idle, sending start of frame identifier in response to the synchronous mode being selected, reading the contents of the buffer in the first repeater, and waiting for a second predetermined period of time after the buffer has been emptied.

The backplane scheme according to the present invention is completely seamless. For small configurations, the inter-repeater backplane pins can be tied directly. For large systems, loading on the backplane contributed by the plug-in repeater modules is the factor that limits direct chip to chip interconnection. For large capacitive loading, the inter-repeater backplane supports the use of external buffers. No additional logic is required for a large system configuration.

Another aspect of the present invention is the unique analog/digital backplane signalling in conjunction with the repeater/IRB (inter-repeater backplane) state machines which makes bus arbitration unnecessary. PORTN and PORTM information is embedded within the backplane signals and hence obviate the need for arbitration. Thus, the inter-repeater backplane can be hot-swapped without needing external logic. For example, a repeater connected to the inter-repeater backplane according to the present invention may be mounted on a PC board in a modular hub configuration. The repeater can be removed and/or plugged in without additional circuitry to take care of bus arbitration or the removal of a signal contained therein. Further, a board hot-swapped will not cause the repeater to pass errors, crash, or hang up.

Another aspect of the invention is that the user is allowed to select between synchronous and asynchronous modes of operation. In synchronous mode, a system and backplane clock are used for all of the repeaters in the hub. Data passing across the backplane is synchronous to these two clocks. A common external source provides both the backplane clock and the system clock to all repeaters. The backplane clock must be synchronous with the system clock. The received data is retimed to the system clock using a receive side FIFO. Both the backplane clock and the retimed data are transmitted over the backplane. Other repeaters on the backplane then repeat the data received over the backplane without additional retiming.

In asynchronous mode an external backplane clock is not required. The repeaters run independently until one takes control of the inter-repeater backplane. A master clock is provided and the repeater receiving the data packet recovers the data via its timing recovery circuitry. The data and the recovered clock are then passed onto the backplane. Each repeater regenerates the preamble on the transmit path, and upon detection of start of frame retimes the backplane data and clocks the data out with its internal clock to each of its ports. All other repeaters synchronize to that clock using a transmit side FIFO for the duration of the transmission.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an inter-repeater backplane interconnecting multiple repeaters into a single hub wherein data may be transmitted between the repeaters associated with the hub either synchronously or asynchronously and wherein individual repeaters or boards may be hot-swapped without causing the backplane to crash or hang-up. According to the present invention, repeaters are linked via an inter-repeater backplane which employs both analog and digital circuitry to convey state machine information. Thus, the inter-repeater backplane of the present invention allows seamless integration at the system level because the repeaters themselves require no additional drivers or external glue logic to implement a multiple board system design.

Figure 1:
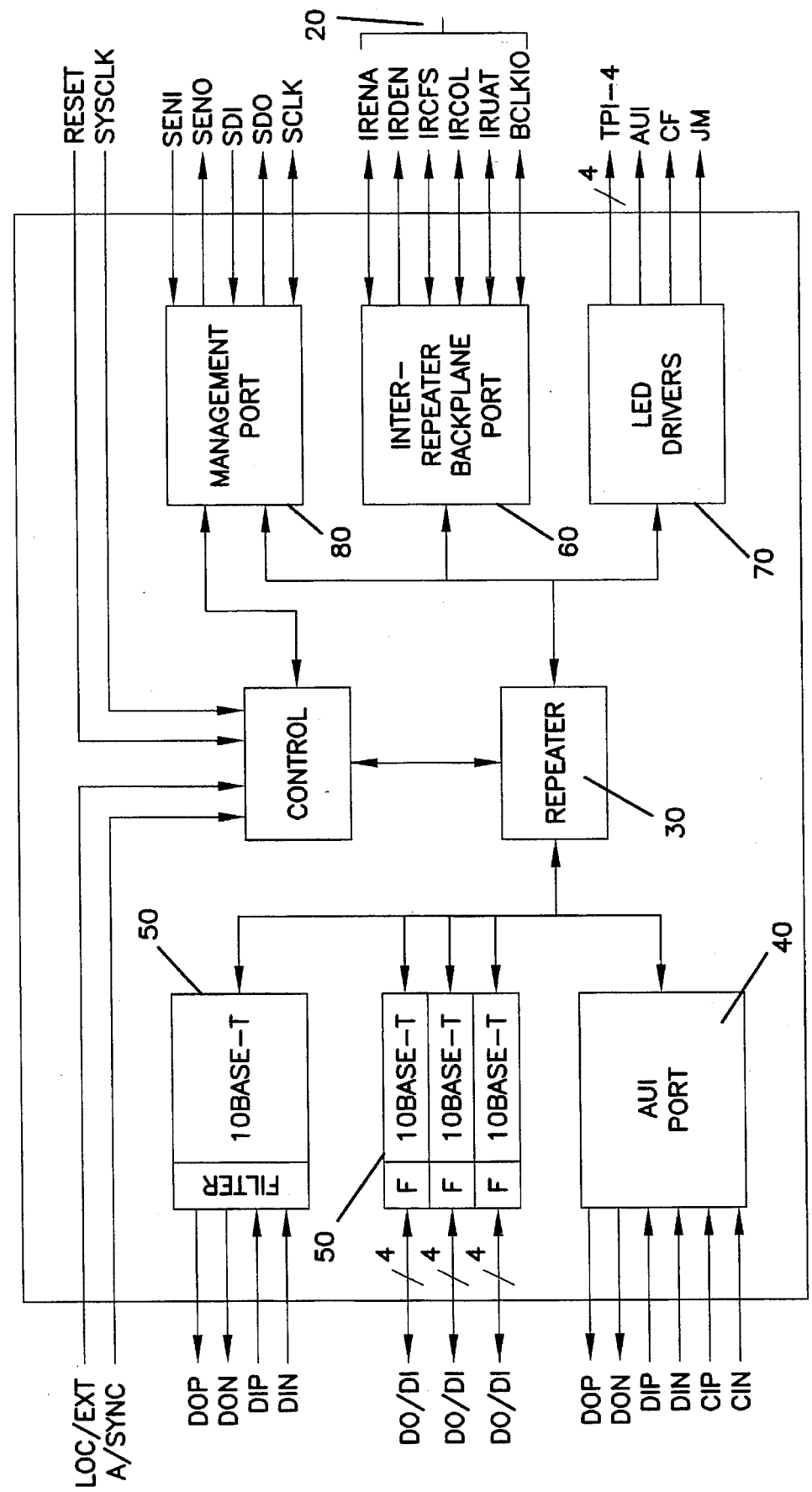
FIG. 1 is a system diagram of an exemplary repeater which can be cascaded together in accordance with the inter-repeater backplane of the present invention.

For a better understanding of the present invention, FIG. 1 illustrates an exemplary integrated hub repeater 10 for 10Base-T networks which may be combined via an inter-repeater backplane 20 according to the present invention. Typically, repeaters include a global repeater state machine, several timers and counters, a timing recovery circuit 30 and a FIFO for performing rate adaptation between transmit and receive clocks. The repeater may also include at least one Attachment Unit Interface (AUI) port 40 and a plurality of 10Base-T transceiver ports 50. AUI ports 40 are utilized to connect the repeater to other external transceivers (e.g., 10Base-2, 10Base-5, 10Base-T, or FOIRL) or to a drop cable.

According to the present invention, repeaters are connected to an inter-repeater backplane by way of an inter-repeater backplane expansion port 60. The inter-repeater backplane expansion port 60 facilitates the interconnection of a large number of 10Base-T ports 50 into an integrated single repeater hub. Further, LED's may be connected to the repeater unit to indicate status of the repeater and may be driven by LED drivers 70. Finally, a network management port 80 may be provided to facilitate network management for both a Media Access Controller (MAC) layer and a physical layer according to the specifications of IEEE Std. 802.

Figure 2:
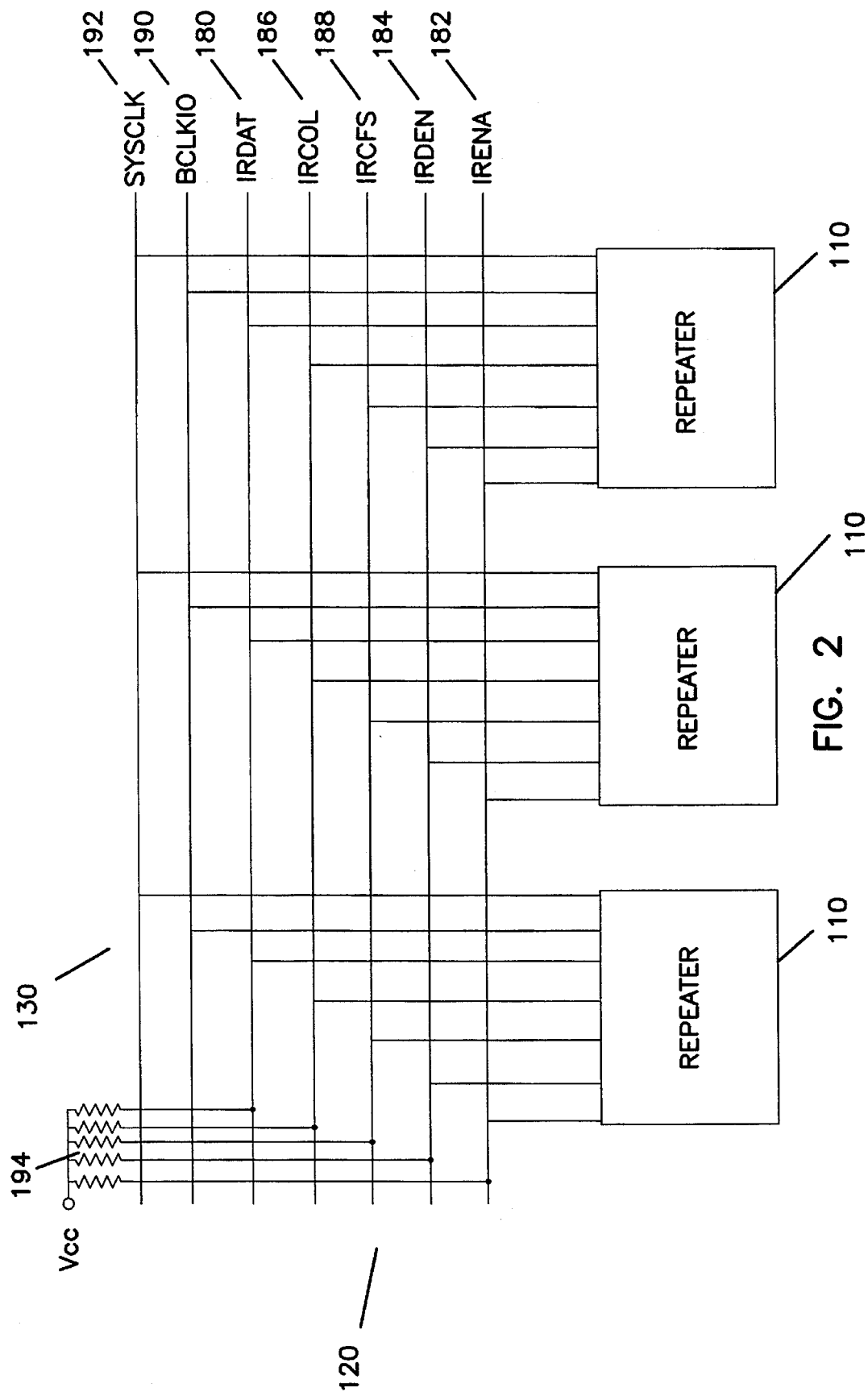
FIG. 2 is a block diagram of repeaters integrated into a single hub via the inter-repeater backplane.

FIG. 2 illustrates several multi-port repeaters 110 connected together to link several 10Base-T ports together via the inter-repeater backplane 120, according to the present invention, to form a single hub 130. The inter-repeater backplane 120 provides the communication medium between each repeater 110. By way of collision signaling on the inter-repeater backplane, all connected repeaters share collision parameters, thereby acting as a single large repeater.

The inter-repeater backplane accommodates seven signals, i.e. IRDAT 180, IRENA 182, IRDEN 184, IRCOL 186, IRCFS 188, BCLKIO 190 and SYSCLK 192. IRDAT 180 is the inter-repeater backplane data path which allows the passage of data between multiple repeaters 110 on the inter-repeater backplane 120. IRENA 182 is the inter-repeater backplane enable which allows individual repeaters 110 to take control of the inter-repeater backplane data bus 180. IRDEN 184 is the inter-repeater backplane driver enable which is used to enable external bus drivers which may be required in synchronous systems with large backplanes. IRDEN 184 is an active low signal which is maintained for the duration of the data transmission.

The inter-repeater backplane 120, according to the present invention, provides collision signalling via a mixed signal state machine interconnect. Collision signaling, according to the present invention utilizes both analog and digital circuitry to convey state machine information to adjacent chips. The collision signaling is handled by IRCOL 186 and IRCFS 188. IRCOL 186 signals collisions and IRCFS 188 is the inter-repeater backplane collision force sense. IRCOL 186 is a digital open-drain whereas IRCFS 188 is an analog/digital signal.

BCLKIO 190 is the inter-repeater backplane clock. The backplane clock 190 is used to synchronize multiple repeaters 110 on the inter-repeater backplane 120. In the asynchronous mode, BCLKIO 190 is supplied only when a repeater 110 is outputting data to the bus 120. Each repeater 110 outputs its internally recovered clock when it takes control of the bus 120. Other repeaters 110 on the backplane 120 then rate adapted via a FIFO (to BCLKIO 190) for the duration of the transmission. In synchronous mode, BCLKIO 190 must be supplied to all repeaters 110 from a common external source.

SYSCLK 192 is the system clock. For both synchronous and asynchronous mode, the system clock is distributed over the backplane from a central source. In synchronous mode, BCLKIO 190 is derived from SYSCLK 192. The synchronous and asynchronous modes of data transmission are described in further detail with reference to FIG. 4 and 5 below.

All backplane signals except for BCLKIO 190 and SYSCLK 192 are open drain and therefore require pullup resistors. Open drain drivers are required to prevent contention since multiple repeaters will simultaneously be driving, in collision, IRCOL 186 and IRCFS 188, or attempting to drive IRDAT 180, IRENA 182, IRDEN 184 when two repeaters receive data at exactly the same time. All hubs 130 in the system monitor the bidirectional pin, IRCFS 188 and IRCOL 186, for transmit collision, PORTM ("one port left state") and IRENA 182 for PORTN (the specific port of a hub receiving data) information. The hub that receives a packet will control the backplane signalling.

The repeater receiving data will pull IRENA 182 low. In addition, that repeater will pull current (approximately 7 milliamps) through the external pullup resistor. This will create a voltage at IRCFS 188 which is approximately one-half of $V_{cc}$. The voltage which is sensed (or scanned) at IRCFS 188 is one-third of $V_{cc}$. If two repeaters receive data at the same time, they will both pull IRENA 182 low and will both pull current through IRCFS 188. When this occurs, IRCFS 188 will be below the threshold and transmit collision is entered. If only one repeater is receiving data, IRENA 182 lets other repeaters in the hub know PORTN has been assigned and deters control of the backplane.

Figure 3:
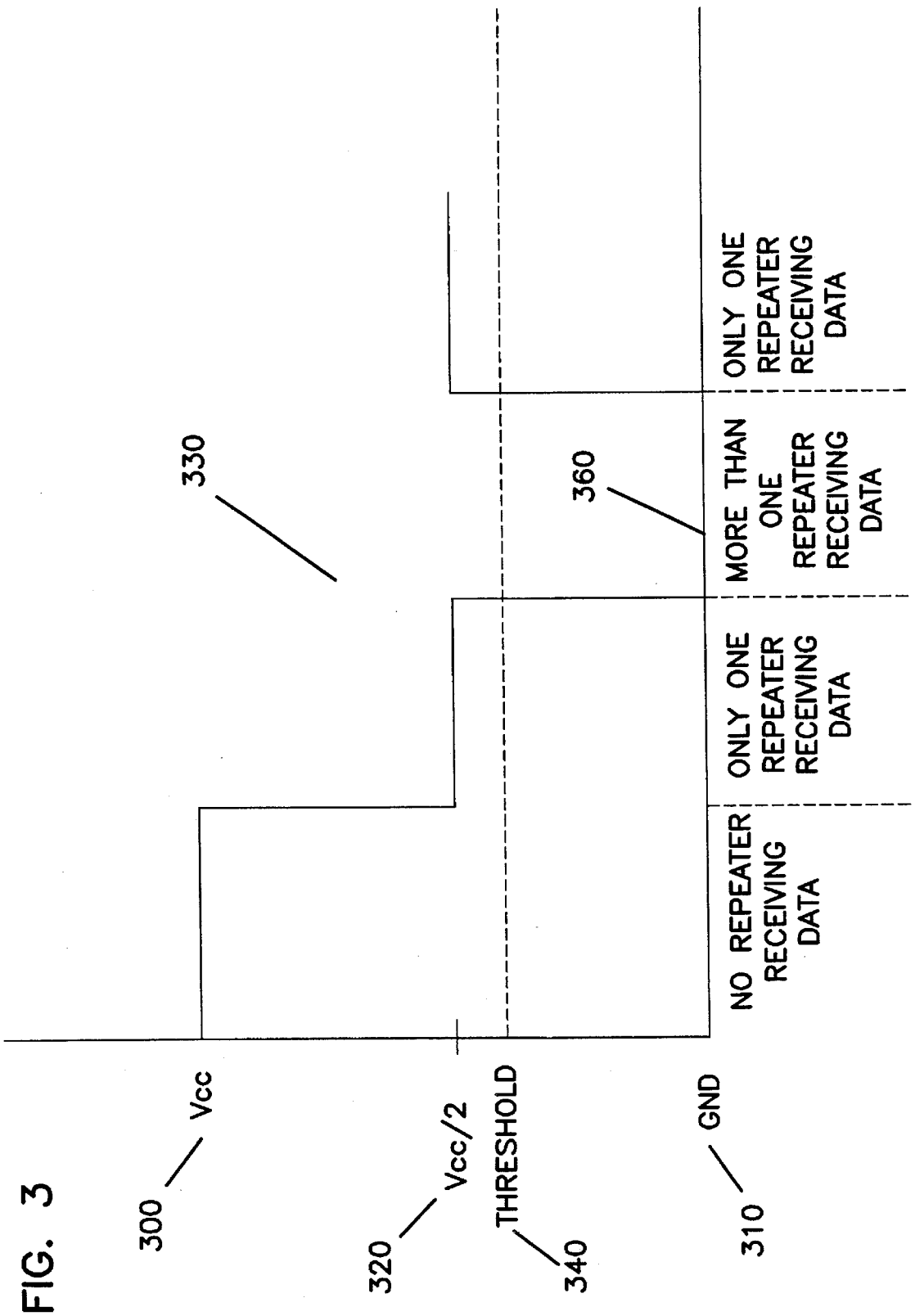
FIG. 3 is a graph of the collision force sense voltage conveyed over the inter-repeater backplane.

Referring to FIG. 3, the voltage level on the IRCFS interconnect is always at one of three values: power source level 300, ground 310 and an intermediate level 320. The signal detected on the mixed signal state machine interconnect conveys whether a collision has occurred according to the magnitude of the detected voltage level 330.

Now referring both to FIG. 2 and FIG. 3, IRCFS 188 sinks a controlled amount of current through the external pull-up resistors 194. Pullup resistors 194 are common to all repeaters 110 in the system. Pull-up resistors 194 are selected to attain a voltage intermediate to power 300 and ground 310 when data is being transmitted. External resistors 194 are chosen so that two constraints are met. A hub 130 will drive IRCFS 188 low 360 if it detects a transmit collision but IRCFS 188 will otherwise remain in the intermediate range 320 when data is being received by any single repeater 110 on the bus 120.

The IRCFS 188 voltage level 330 is initially at the power source level 300. When a single repeater 110 receives data, the IRCFS 188 voltage level 330 falls below the initial IRCFS 188 voltage level 300 due to the voltage drop across the global pull-up resistors 194. However, this intermediate IRCFS 188 voltage level 320 remains sufficiently high so as to be perceived as approximately a TTL logic high to other repeaters 110 in the hub 130. Threshold monitoring is performed by a comparator having its threshold set at one-third of $V_{cc}$. This voltage is approximately the same as that of a TTL high.

If a second repeater 110 receives a packet of data at the same time, the second repeater 110 will also sink the same amount of current through the external pull-up resistors 194. This will cause the IRCFS 188 voltage 330 to drop below a predetermined threshold 340 such as a TTL logic low. This condition informs all other repeaters 110 in the hub 130 that a transmit collision state 360 has been entered. This state 360 will exist as long as more than one repeater 110 is receiving data or for 96 bits, whichever is longer. IEEE 802.3 Repeater State Diagram mandates that collision be maintained for 96 bit times (9.6 microseconds).

Thus, as an input, the hub 130 implements an threshold sensing scheme to allow a hub 130 to detect when multiple repeaters 110 are receiving data simultaneously. By comparing the voltage level 330 of the IRCFS bus 188 with a predetermined threshold level 340, transmit collision can be detected. As an output, IRCFS 188 is driven to an intermediate voltage 320 by the repeater 110 receiving data to signify to other repeaters 110 that a repeater 110 is receiving data. IRCFS 188 in conjunction with the digital pin, IRCOL 186, is used to indicate this PORTM (only one repeater remains in collision) condition after the system has gone into a transmit collision state 360.

The identification of the port receiving data (PORTN) is established internally within that receiving chip. PORTN is conveyed to the other repeaters in the hub by virtue of the fact that the data framing signal, IRENA 182, was pulled low by the repeater 110 receiving data.

The inter-repeater backplane also conveys receive collision state information. Receive collision is a collision which occurs on the port designated as PORTN. On the inter-repeater backplane, receive collision is distinguished from transmit collision by virtue of the fact that IRCOL is pulled low but IRCFS 188 is not pulled to ground. Only the port in collision is sinking the current and thus the threshold A+ IRCFS is not crossed.

The inter-repeater backplane allows the user to select between synchronous and asynchronous modes of operation.

Figure 4:
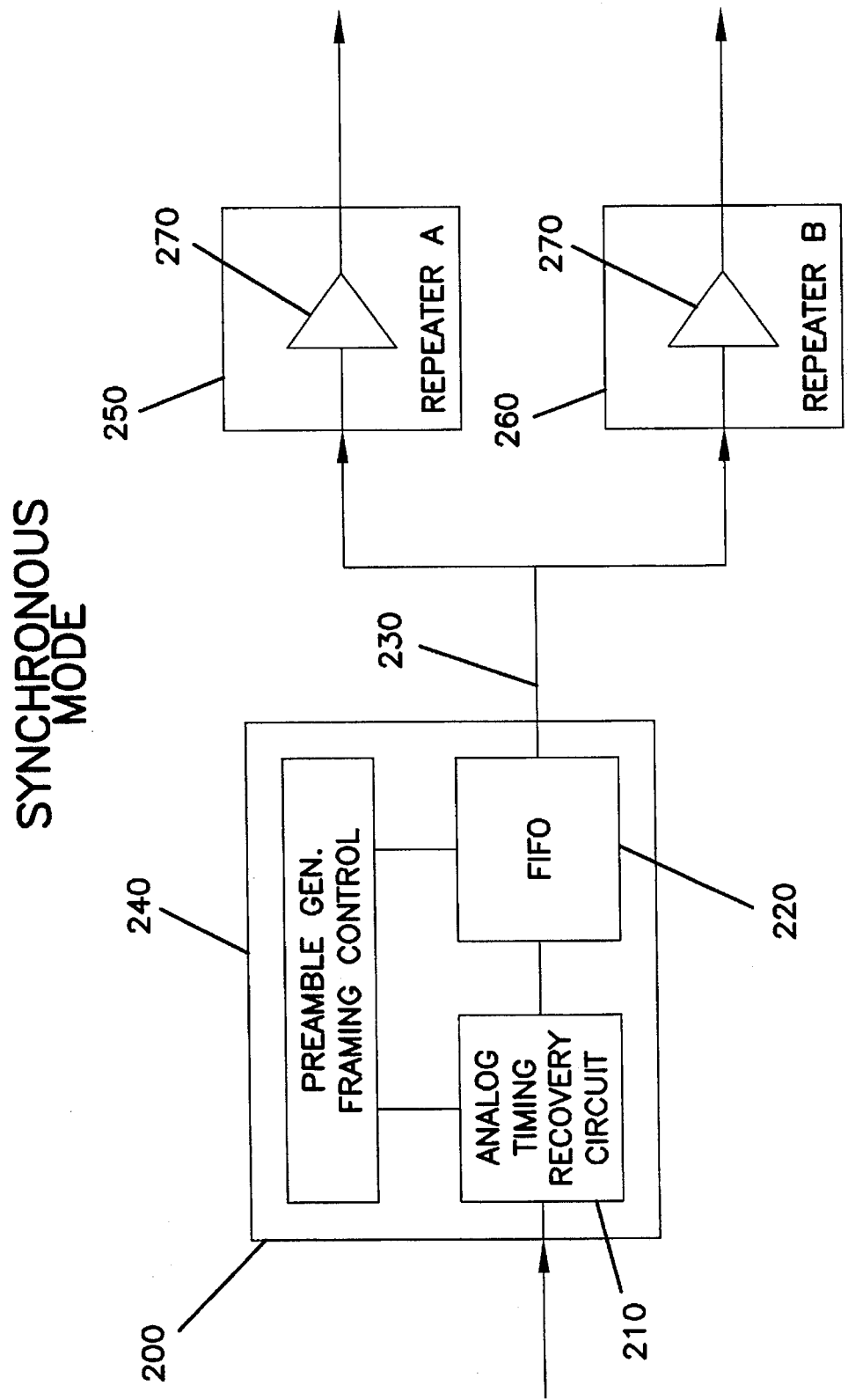
FIG. 4 is a block diagram of repeaters transmitting data synchronously via the inter-repeater backplane.

FIG. 4 illustrates the synchronous mode of operation. In synchronous mode, a system 10 MHz and 20 MHz clock are used for all of the repeaters in the hub. Data passing across the Inter-Repeater Backplane is synchronous to these two clocks. The common external source provides a common 10 MHz backplane clock (BCLKIO). A 20 MHz system clock can be derived therefrom using, for example, a phase-locked loop. The 10 MHz inter-repeater backplane clock must be synchronous with the 20 MHz system clock. The 10 MHz inter-repeater backplane clock may be derived from the 20 MHz clock using a divide-by-two circuit. The repeater 200 receiving the data packet recovers the data via its timing recovery circuitry 210. The data is passed to a FIFO 220 where it is retimed to the system 10 MHz clock using a receive side FIFO and passed onto the backplane 230. This repeater 200 is also responsible for regenerating the preamble on the receive side and controlling the data framing signals 240 on the backplane 230. Both the 10 MHz inter-repeater backplane clock and the retimed data are then transmitted over the backplane 230. Other repeaters 250, 260 on the backplane 230 then repeat 270 the data received over the backplane 230 without additional retiming. For illustration purposes, only two additional repeaters 250, 260 are shown. However, it is to be understood that additional repeaters could be attached to the backplane in accordance with the invention.

Figure 5:
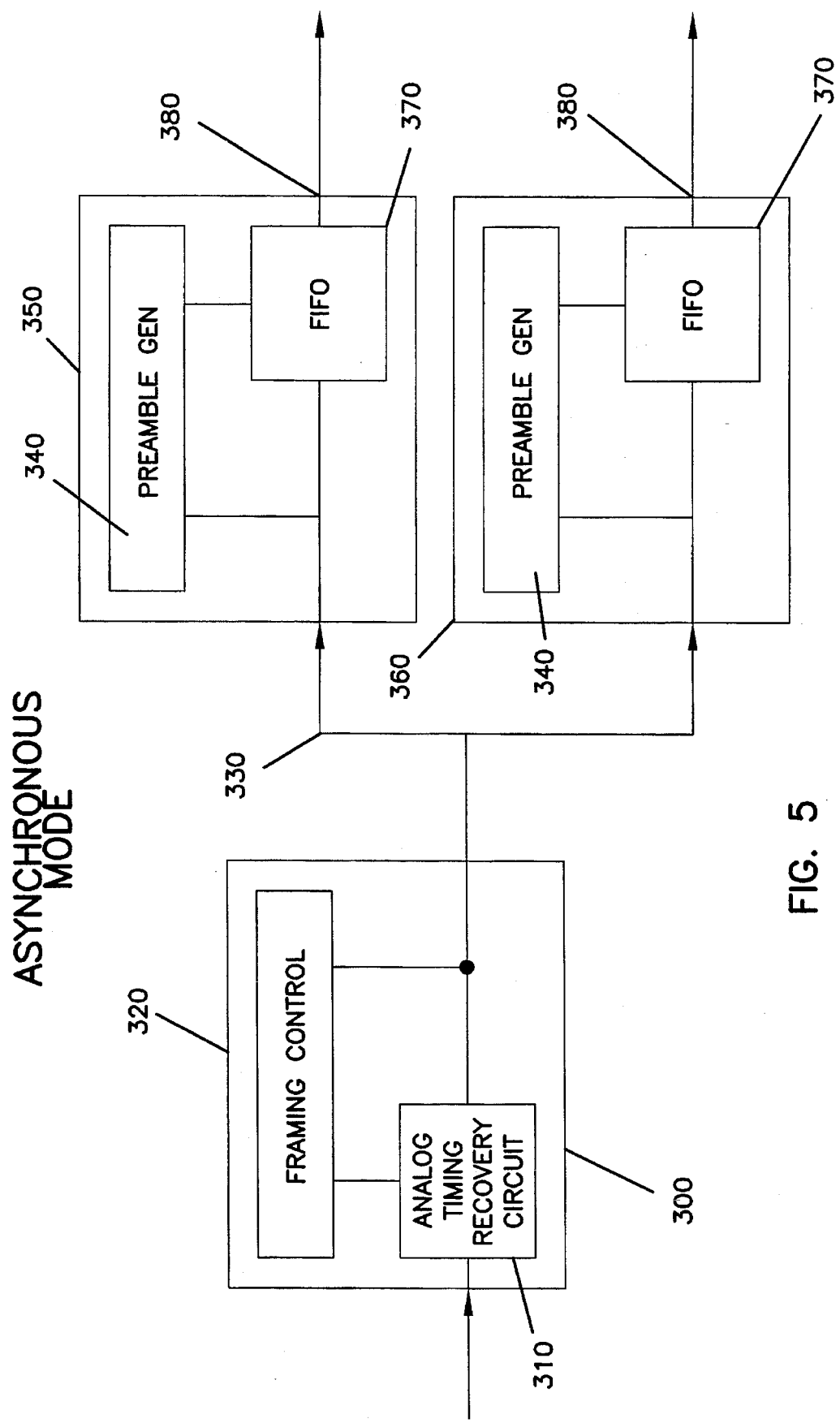
FIG. 5 is a block diagram of repeaters transmitting data asynchronously via the inter-repeater backplane.

The asynchronous mode of transmission is illustrated in FIG. 5. In asynchronous mode an external 10 MHz inter-repeater backplane clock is not required. Instead a master clock is provided for the system, each chip in the system, or each card comprising the system. For example, each repeater could run off its own clock source. Thus, the repeaters run independently until one takes control of the inter-repeater backplane. The repeater 300 receiving the data packet recovers the data via its timing recovery circuitry 310. This repeater 300 is also responsible for controlling the data framing signals 320 on the backplane 330. After recovering the data and establishing the data framing, the data and the recovered clock are passed onto the inter-repeater backplane 330. All other repeaters 350, 360 synchronize to that clock for the duration of the transmission. In the asynchronous mode, preamble regeneration 340 takes place on the transmit side. Each repeater 350, 360 on the inter-repeater backplane regenerates the preamble 340, and upon detection of start of frame retimes the backplane data via its transmit side FIFO 370 and clocks the data out with its internal 10 MHz clock to each of its ports 380.

Figure 6:
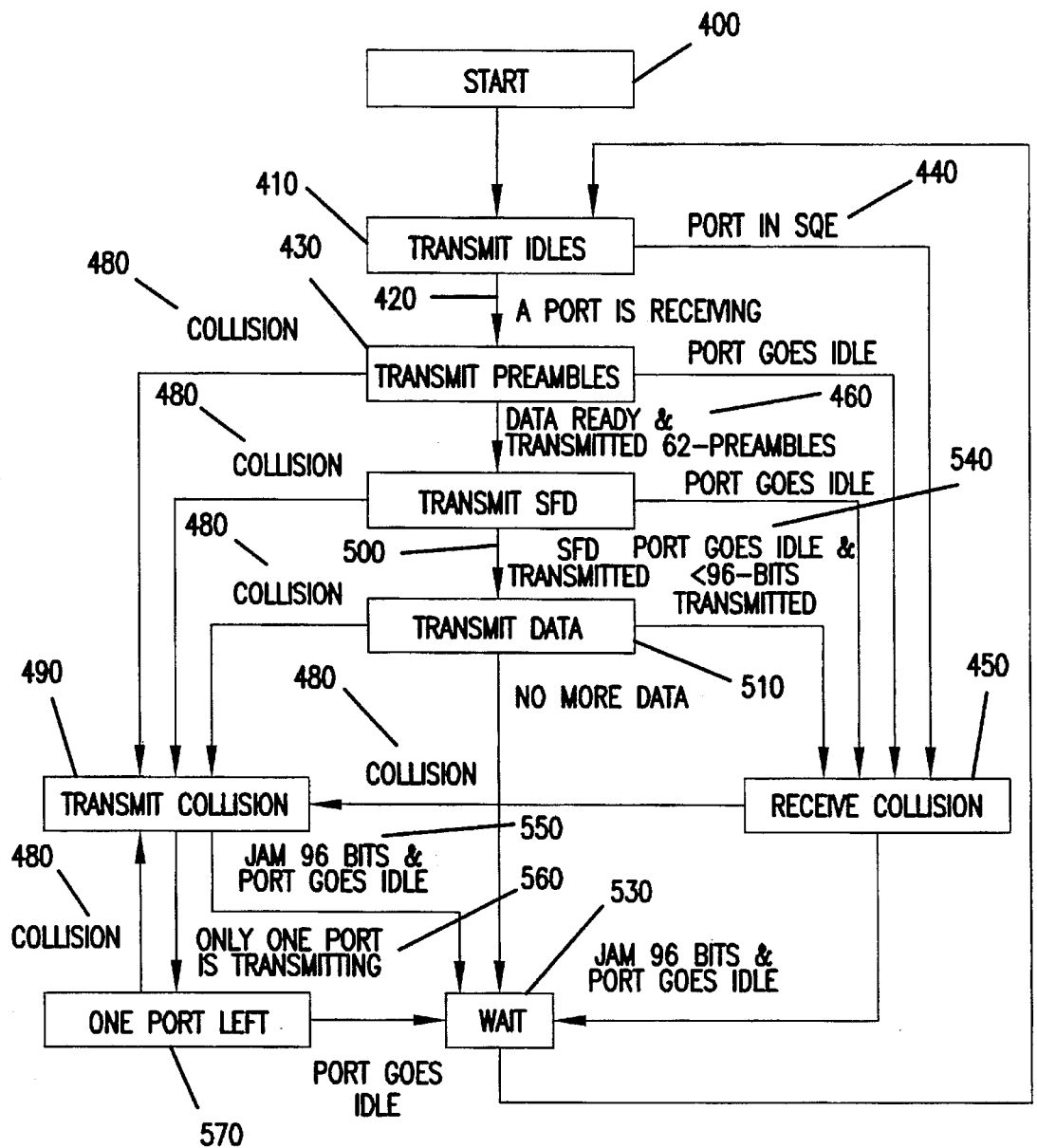
FIG. 6 is a state diagram illustrating the repeater state machine.
Figure 7:
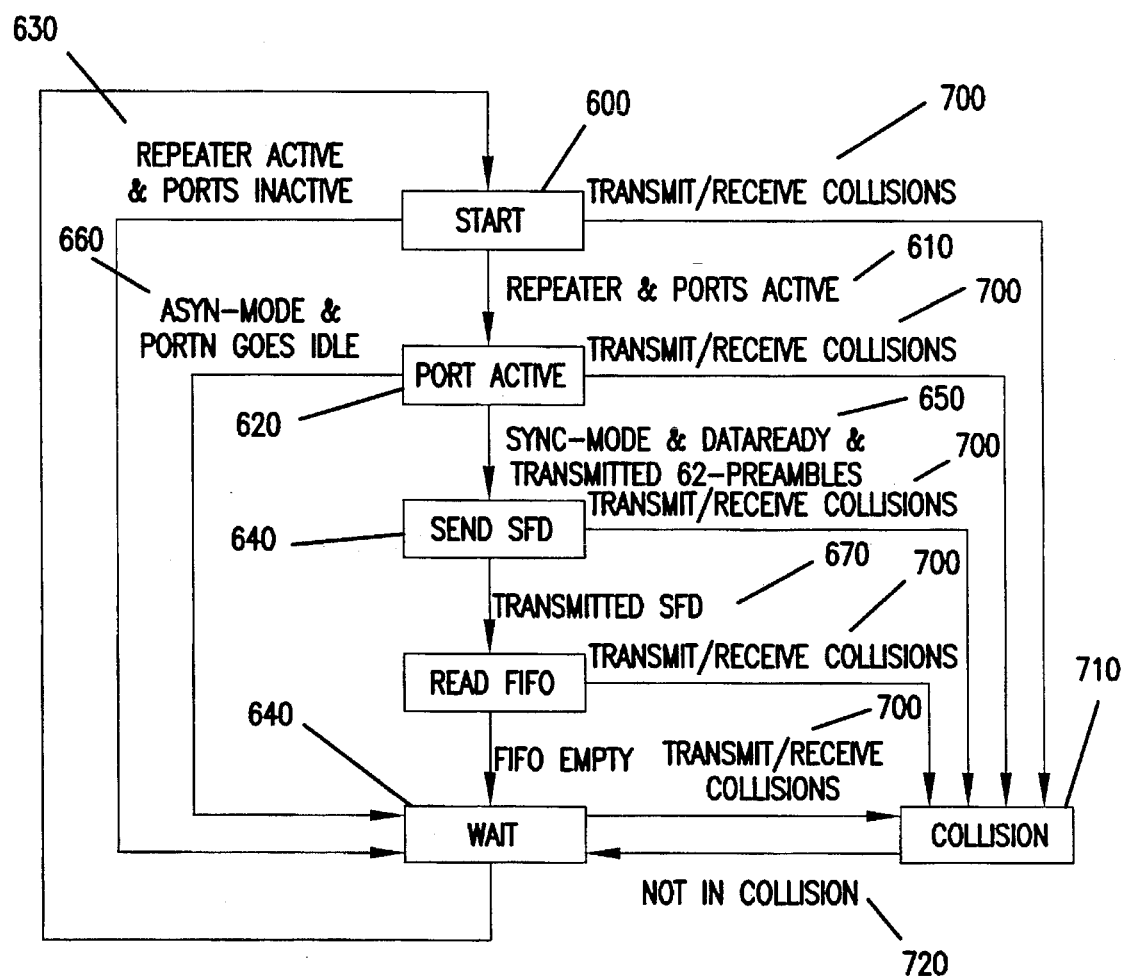
FIG. 7 is a state diagram illustrating the backplane state machine.

Two state machines are utilized to implement both the synchronous and asynchronous backplane control scheme. The state diagram of the Repeater State Machine is shown in FIG. 6. The state diagram for the inter-repeater state machine is shown in FIG. 7. Together they comply with the 802.3 Repeater State Machine requirements established by Section 9 of the IEEE 802.3 Standard. The state machines allows repeaters to transmit data in either synchronous or asynchronous mode. These state machines comply with 802.3 IEEE Standards and facilitate both synchronous and asynchronous data transmission without requiring an external bus and bus arbiter.

The repeater state machine will be described with reference to FIG. 6. Repeaters enter an idle state upon being energized. When a port on a repeater receives data, the repeater begins to transmit a preamble pattern unless a port on that repeater is already in collision. In the latter case, the repeater transitions to the receive collision state. When the data is ready to be transmitted and 62 preambles have been transmitted, the machine transitions to the transmit SFD (start of frame) state. However, if a port goes idle during the transmission of the preambles, the repeater transitions to the receive collision state. Whenever a port receives and transmits at the same time, then the transmit collision state is entered.

Once the SFD is transmitted, the repeater transitions to the transmit data state. When all of the data has been transmitted, the repeater transitions to the wait state before finally recycling to the transmit idle state. However, if a port goes idle on the repeater and less than 96 bits were transmitted, the repeater transitions to the receive collision state.

As described above, whenever a collision is detected, the repeater transitions to the transmit collision state. If no data are being received on its ports after the repeater transmits a Jam of 96 bits to all of the ports to which it is connected, the port goes idle and the repeater state machine transitions to the wait state. If only one port is receiving data when the repeater is in the transmit collision state after jamming for 96 bits, the repeater enters the one port left state. If a collision is detected, the repeater returns to the transmit collision state.

The backplane state machine will be described with reference to FIG. 7. The backplane is initialized in the start state. When the repeater and ports become active, the backplane transitions to the port active state. If the repeater is active but the ports remain inactive, the backplane transitions from the start state to the wait state instead.

The backplane transitions from the port active state to the send SFD state after 62 preambles are sent if the repeater is set for synchronous data transmission and the data is ready to be transmitted. However, if the repeater is set for asynchronous mode of data transmission and PORTN goes idle, the repeater transitions to the wait state.

Once the SFD signal has been transmitted, the backplane transitions to the read FIFO state. Once the FIFO buffer is empty, the backplane transitions to the wait state. Thereafter the backplane recycles to the start state. If another repeater on the backplane is receiving data, the backplane transitions from the state therein to the collision state. When only one or no repeater on the backplane is receiving data, the backplane transitions from the collision state to the wait state.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An inter-repeater backplane connecting multiple repeaters together to form a hub system, comprising:

a bus comprising a plurality of electrically conductive signal lines coupled between repeaters for communicating electrical signals therebetween, wherein at least one of the lines has an analog voltage level for signaling repeater state information;

a receiver, coupled to the bus at an input port of a first repeater, for receiving a first data signal;

means, coupled to the receiver, for recovering data from the first data signal, for generating a preamble and for generating a start of frame signal for the recovered data;

timing means, coupled to the recovering and generating means, for retiming the recovered data to a clock;

means, coupled to the timing means, for transmitting a second data signal comprising the start of frame signal, the preamble and the recovered data, the second data signal being routed on to the bus; and repeating means, coupled to the input port of the remaining repeaters on the bus, for receiving and repeating the second data signal.

2. The inter-repeater backplane of claim 1 further comprising a buffer, coupled to the recovering and generating means, for storing the recovered data.

3. The inter-repeater backplane of claim 1 wherein the clock is internal to the first repeater.

4. The inter-repeater backplane of claim 1 wherein the second data signal is repeated without further retiming.

5. The inter-repeater backplane of claim 4 further comprising:

wait means, coupled to the transmitting means, for inhibiting the transmitting means for a predetermined period of time after all of the received data has been transmitted to the bus; and idle means, coupled to the timing means, for transmitting idle signals after the predetermined period of time has elapsed.

6. The inter-repeater backplane of claim 5 further comprising:

a first signaling means, coupled to the bus, for sending a transmit collision signal when a plurality of repeaters attempt to transmit data over the bus simultaneously; and jamming means, coupled to the bus, for jamming the bus after signaling a transmit collision.

7. The inter-repeater backplane of claim 6 further comprising:

a detector, coupled to the bus, for detecting when only one port continues to transmit after a transmit collision signal has been transmitted; and a second signaling means, coupled to the bus, for signaling that only one port continues to transmit after a transmit collision signal has been transmitted over the bus.

8. The inter-repeater backplane of claim 5 further comprising:

collision signalling means, coupled to the transmitting means, for transmitting a collision signal if less than 96 bits were transmitted; and jamming means, coupled to the transmitting means, for transmitting a stream of 96 bits after the collision signal is transmitted.

9. The inter-repeater backplane of claim 1 further comprising:

wait means, coupled to the transmitting means, for inhibiting the transmitting means for a predetermined period of time after all of the received data has been transmitted to the bus;

transition means, coupled to the transmitting means, for causing the repeater to idle after the predetermined period of time has elapsed;

collision signalling means, coupled to the transmitting means, for transmitting a collision signal if less than 96 bits were transmitted; and jamming means, coupled to the transmitting means, for transmitting a stream of 96 bits after the collision signal is transmitted.

10. The inter-repeater backplane of claim 9 further comprising:

a detector, coupled to the bus, for detecting when only one port continues to transmit after a transmit collision signal has been transmitted; and a second signaling means, coupled to the bus, for signaling that only one port continues to transmit after a transmit collision signal has been transmitted over the bus.

11. The inter-repeater backplane of claim 2 further comprising:

initializing means, coupled to repeaters connected to the bus, for initializing the repeaters and the bus;

determining means, couple to the initializing means, for determining whether ports on the repeaters are active; and mode detecting means, coupled to the bus, for determining the mode of data transmission.

12. The inter-repeater backplane of claim 11 further comprising;

reading means, coupled to the bus, for reading the contents of the buffer in the first repeater; and wait means, coupled to the bus, for causing the repeaters to wait for a predetermined period of time after the buffer has been emptied.

13. The inter-repeater backplane of claim 11 wherein the transmitting means waits for a predetermined period of time in response to a repeater port receiving data going idle and an asynchronous mode of data transmission being selected.

14. The inter-repeater backplane of claim 11 wherein the transmit means send a start of frame identifier in response to the synchronous mode being selected.

15. An inter-repeater backplane connecting multiple repeaters together to form a hub system, comprising:

a bus comprising a plurality of electrically conductive signal lines coupled between repeaters for communicating electrical signals therebetween, wherein at least one of the lines has an analog voltage level for signaling repeater state information;

a receiver, coupled to the bus at an input port of a first repeater, for receiving a first data signal;

control means, coupled to the first repeater, for taking control of the bus after receiving the first data signal;

recovering means, coupled to the control means, for obtaining the data from the received data signal;

first generating means, coupled to the recovery means, for generating a start of frame structure and a clock signal;

a transmitter, coupled to the generating means, for transmitting a second data signal on to the bus according to the clock signal, the second data signal comprising the recovered data and the start of frame structure;

second generating means, coupled to the bus at an input port of each remaining repeater, for generating a preamble;

a detector, coupled to each second generating means, for detecting the start of frame structure;

timer means, coupled to each detector, for retiming the data at each subsequent repeater;

means, coupled to each timer means, for repeating the second data signal; and output means, coupled to each repeating means, for clocking the second data signal out of each remaining repeater.

16. The inter-repeater backplane of claim 15 further comprising:

structure means, coupled to the timer means, for transmitting a preamble and a start of frame identifier over the bus; and wait means, coupled to the transmitting means, for inhibiting the transmitter for a predetermined period of time.

17. The inter-repeater backplane of claim 16 further comprising idle means, coupled to the timer means, for transmitting idle signals after the predetermined period of time has lapsed.

18. The inter-repeater backplane of claim 15 further comprising:

a first signaling means, coupled to the bus, for sending a transmit collision signal when a plurality of repeaters attempt to transmit data over the bus simultaneously;

jamming means, coupled to the bus, for jamming the bus after signaling a transmit collision;

a detector, coupled to the bus, for detecting when only one port continues to transmit after a transmit collision signal has been transmitted; and a second signaling means, coupled to the bus, for signaling that only one port continues to transmit after a transmit collision signal has been transmitted over the bus.

19. The inter-repeater backplane of claim 17 further comprising a third signaling means, coupled to the bus, for signaling a collision if a repeater connected to the bus attempts to transmit while simultaneously receiving data.

20. A method of passing data between multiple repeaters connected by a backplane, comprising the steps of:

receiving a first data signal at an input port of a first repeater in a hub of multiple repeaters interconnected by a backplane;

recovering data from the first data signal, and generating a preamble and a framing structure for the recovered data;

passing the recovered data to a buffer internal to the first repeater;

retiming the recovered data to a system clock internal to the first repeater;

transmitting a second data signal formed by the framing structure, preamble and the recovered data, the second data signal being routed to the backplane;

receiving the second data signal at the input port of the remaining repeaters connected to the backplane; and repeating the second data signal without retiming.

21. A method of passing data between multiple repeaters connected by a backplane, comprising the steps of:

receiving a first data signal at an input port of a first repeater in a hub of multiple repeaters interconnected by a backplane;

taking control of the backplane by the first repeater after receiving the first data signal;

recovering the data from the received data signal;

generating a data framing structure and a clock signal;

transmitting a second data signal on to the backplane, the second data signal resulting from the combination of the recovered data, and the data framing structure;

generating the preamble, detecting the start of frame structure, and retiming the data at each subsequent repeater receiving second data signal from the first repeater; and repeating the second data signal and a clock signal derived from a clock internal to each subsequent repeater.

22. A method of passing data between multiple repeaters connected by a backplane, comprising the steps of:

a) receiving a first data signal at an input port of a first repeater in a hub of multiple repeaters interconnected by a backplane;

b) recovering the data from the received data signal;

c) transmitting idle signals over the backplane;

d) transmitting a preamble over the backplane;

e) transmitting a start of frame identifier over the backplane;

f) transmitting a second data signal on to the backplane, the second data signal derived from the recovered data obtained from the received first data signal;

g) waiting for a predetermined period of time; and h) repeating steps a through g.

23. The method of claim 22 further comprising the steps of:

i) signaling a transmit collision when a plurality of repeaters attempt to transmit data over the backplane;

j) jamming the backplane after signaling a transmit collision;

k) detecting when one port is left transmitting after a collision is detected; and l) signaling one port left after a transmit collision has been communicated to the repeaters connected to the backplane.

24. A method of passing data between multiple repeaters connected by a backplane, comprising the steps of:

initializing the backplane;

determining whether ports on repeaters interconnected by the backplane are active;

determining the mode of data transmission;

sending preambles over the backplane;

waiting for a first predetermined period of time in response to the asynchronous mode being selected and a port in the repeater receiving data going idle;

sending start of frame identifier in response to the synchronous mode being selected;

reading the contents of the buffer in the first repeater; and waiting for a second predetermined period of time after the buffer has been emptied.

25. The method of claim 24 further comprising the steps of:

signaling collision if a repeater connected to the backplane attempts to transmit while simultaneously receiving data; and signaling collision if a plurality of repeaters attempt to transmit at the same time.

\* \* \* \* \*